United States Patent [19]

Vanhoye et al.

[11] Patent Number: 5,728,749
[45] Date of Patent: Mar. 17, 1998

[54] PHOTOCROSSLINKABLE COMPOSITIONS BASED ON CRAFTED REACTIVE TELOMER OF TRIFLUOROETHYL METHACRYLATE AND PROCESSES FOR THEIR PREPARATION

[75] Inventors: Didier Vanhoye, Bernay; Elsa Ballot, Perigny-sur-Yerres; Robert Legros, Monceaux; Olivier Loubet, Servian; Bernard Boutevin; Bruno Ameduri, both of Montpellier, all of France

[73] Assignee: Elf Atochem S.A., Puteaux, France

[21] Appl. No.: 564,980

[22] Filed: Nov. 30, 1995

[30] Foreign Application Priority Data

Nov. 30, 1994 [FR] France .................................. 94 14367

[51] Int. Cl.$^6$ ............................. C08F 2/50; C08F 2/38; C08G 75/04
[52] U.S. Cl. ..................... 522/141; 522/142; 522/149; 522/180; 522/42; 522/44; 525/63; 528/364; 528/376; 528/401
[58] Field of Search .................. 522/42, 149, 166, 522/162, 120, 121, 141, 142, 180; 525/69, 63; 528/401, 364, 376

[56] References Cited

U.S. PATENT DOCUMENTS 4,312,916  1/1982  Kakumaru et al. .................... 522/121

FOREIGN PATENT DOCUMENTS 0 243 605  11/1987  European Pat. Off. .
0 426 530   5/1991  European Pat. Off. .
2607509   11/1986  France .
2615517    5/1987  France .

OTHER PUBLICATIONS

Abstract, Week 8717, No. 87–119489 (JP 62–063560), Derwent Publications, Ltd., London, Great Britain, Mar. 1987.

Abstract, JP 62–063560, Derwent Publications, Ltd., London, Great Britain Mar. 1987.

Abstract, Week 9135, N. 91–257388 (JP 3–168749), Derwent Publications, Ltd., London, Great Britain, Jul. 1991.

Abstract, JP 3–168749, Derwent Publications, Ltd., London, Great Britain Jul. 1991.

*Primary Examiner*—Susan W. Berman
*Attorney, Agent, or Firm*—Millen, White, Zelano & Branigan, P.C.

[57] ABSTRACT

This photopolymerizable composition includes an grafted reactive telomer containing trifluoroethyl methacrylate units, a reactive diluent and a photopolymerization initiator. It gives hydrophobic transparent coatings.

19 Claims, No Drawings

PHOTOCROSSLINKABLE COMPOSITIONS BASED ON CRAFTED REACTIVE TELOMER OF TRIFLUOROETHYL METHACRYLATE AND PROCESSES FOR THEIR PREPARATION

The present invention relates to compositions based on trifluoroethyl methacrylate, which are thermocrosslinkable or photopolymerizable and/or photocrosslinkable and which can be employed in the field of coatings that are heat-curable or crosslinkable under radiation, for example in varnishes, adhesives, inks or printed circuits, in which they bring about an improvement in the hydrophobic and oleophobic properties of the protective coatings.

The synthesis of acrylic resins of low molecular mass in solution according to the telomerization technique is will known and has been described in reference works such as "Free radical telomerization" by C. M. Starks (Academic Press 1974) etc. The synthesis of reactive oligomers obtained by telomerization of a reactive monomer consisting of an acrylic carboxylic monomer or an epoxidized acrylic monomer or a hydroxylated acrylic monomer has already been described. These telomers bearing reactive functional groups are next grafted with an acrylic monomer bearing a functional group that is chemically reactive with the functional groups of the telomers. The resins obtained can subsequently be cured in the presence of a polymerization initiator at the appropriate temperature or by the action of an ultraviolet radiation in the presence of a photo-initiator. This work is illustrated, for example, in the thesis of M. Maliszewics, defended in 1982 in Montpellier, relating to the synthesis of photocrosslinkable telomers, and in that of M. J. L. Parisi, submitted in 1985, "Synthesis of photocrosslinkable telomers and application to metal coatings and to the sizing of carbon fibres".

French Patent Applications FR-A-2 607 509 and 2 615 517 also refer to the synthesis of unsaturated polyacrylic resin compositions and to the process for curing them.

Grafting of polyacrylic resins bearing epoxy groups with a (meth)acrylic acid and photocrosslinking of the compositions obtained has been described in Polymer Photochemistry 5, (1984), pp. 93–107.

More recently, the synthesis of functional polymers which have pendent methacrylic groups obtained by reaction of an epoxidated monomer with the maleimidobenzoic acid structures of the polymer has been described in Angewandte Makromolekulare Chemie 212 (1993), pp. 53–65, the new compositions obtained being employed in the field of photocrosslinking.

Furthermore, the preparation of fluoro telomers has been described in Patent EP 426 530, by the action of a fluorothiol on a perfluorinated monomer which has a fluoroalkylene chain of 2 to 20 carbons. The uses of these new compositions relate to the fields of textiles and of leather, in which they contribute water-repellency and oil-repellency properties. These compositions are not thermally or photochemically curable and relate to applications requiring a high performance level (oleophilicity) and justify a high cost of the coating.

However, there are a certain number of applications in which the property sought after relates to the resistance of the coating to water and to chemical agents.

The invention provides this, using a new polymeric composition which consists a) of 30 to 90 parts by weight of an oligomer which has a degree of polymerization of between 5 and 16 and which contains from 75 to 95% by weight of trifluoroethyl methacrylate units and from 5 to 25% by weight of units of a thiol of formula R—SH in which R is a linear alkyl containing from 8 to 20 carbon atoms or alkyleneperfluoroalkyl containing from 1 to 4 carbon atoms in the alkylene portion and from 8 to 20 carbon atoms in total, or of a functional thiol, b) of 10 to 70 parts by weight of a diluent.

The invention is also aimed at a composition consisting:

a) of 50 to 90 parts by weight of an oligomer which has a degree of polymerization of between 5 and 16 and contains from 15 to 80% by weight of trifluoroethyl methacrylate units, from 5 to 25% by weight of units of a thiol as defined above and from 5 to 40% by weight of units of a reactive monomer chosen from i) acrylic acid or methacrylic acid, and ii) epoxidized acrylic monomers, hydroxylated acrylic monomers and acrylic monomers containing a highly reactive functional group, and from 1 to 25% by weight of units of a monomer according to i) when the oligomer already contains units of reactive monomer according to ii) or of units of a monomer ii) when the oligomer already contains a unit according to i) as units of reactive monomer, b) of 10 to 50 parts by weight of a diluent, c) of a quantity of photopolymerization initiator which is sufficient to cause the crosslinking of the composition when exposed to an actinic radiation.

Finally, the invention is aimed at a photopolymerizable composition which consists a) of 90 to 50 parts by weight of an oligomer which has a degree of polymerization of between 5 and 16 and contains from 15 to 80% by weight of trifluoroethyl methacrylate units, from 5 to 40% by weight of units of a reactive monomer as defined under i) or under ii) above, from 5 to 25% by weight of units of a thiol as defined above, from 5 to 60% by weight of units of acrylic monomer devoid of any reactive functional group and from 1 to 25% by weight of units of reactive monomer as defined under i) when the oligomer already contains units of reactive acrylic monomer defined under ii) or units of reactive monomer defined under ii), when the oligomer already contains units of reactive acrylic monomer defined under i), b) of 10 to 50 parts by weight of a diluent, c) of a quantity of photopolymerization initiator which is sufficient to cause the crosslinking of the composition when exposed to an actinic radiation.

The oligomers according to the invention have hydrophobic properties which are due to the presence of trifluoro ethyl methacrylate without having, in contrast to the latter, too low a boiling point which would restrict their use in tunnels for exposure to ultraviolet light.

The process according to the invention is divided into 3 stages:

1. Synthesis of the reactive telomers,
2. Grafting of the reactive telomers,
3. Curing of the polyacrylic compositions obtained, to obtain protective coatings exhibiting improved hydrophobic performance.

Synthesis of the reactive telomers

The telomers according to the invention are obtained by reacting trifluoroethyl methacrylate optionally with an acrylic monomer containing a reactive functional group and optionally one or a number of other acrylic monomers containing an alkyl chain and devoid of any reactive group, in the presence of a large quantity of a transfer agent exhibiting a high transfer constant and of an azo or peroxide initiator, in an inert solvent. The reaction is conducted at normal pressure at a temperature which is a function of the solvent and of the initiator which are employed. This reaction can also be carried out at higher pressure, without this contributing a decisive advantage. The telomers obtained have a number-average molecular mass of between 600 and 5000 and preferably between 1000 and 3000.

In the process according to the invention trifluoroethyl methacrylate is employed in a proportion of 15 to 80% by weight and preferably of 20 to 60% by weight.

The reactive monomer is chosen from carboxylic acrylic monomers: acrylic acid and methacrylic acid, or from epoxidized acrylic monomers: preferably glycidyl methacrylate or else from hydroxylated acrylic monomers such as hydroxyethyl, hydroxypropyl and hydroxybutyl (meth) acrylates, preferably hydroxyethyl (meth)acrylates.

The reactive monomer may also be chosen from (meth) acrylic monomers containing highly reactive functional groups, such as (meth)acryloyl chlorides and (meth) acryloyloxyalkyl isocyanates, preferably methacryloyl chloride and methacryloyloxyethyl isocyanate. The reactive monomers preferably employed are (meth)acrylic acids and glycidyl methacrylate.

The reactive acrylic monomer is introduced in a proportion of 5 to 40% by weight, preferably 5 to 30% by weight, so as to contribute the desired number of functional groups.

The acrylic monomers devoid of reactive functional groups are chosen from the class of alkyl methacrylate and acrylate monomers, such as butyl methacrylate, butyl acrylate, ethyl acrylate, methyl acrylate, 2-ethylhexyl acrylate, nonyl acrylate or octyl acrylate. These monomers are preferably chosen from those which give a homopolymer of low Tg (glass transition temperature) because of the high Tg of the polyTRIFEMA (80° C.), such as butyl acrylate or 2-ethylhexyl acrylate, in order to ensure a suitable Tg for the tertelomer (20<Tg<70). These monomers are introduced in a proportion of 5 to 60% by weight, preferably of 20 to 50% by weight.

The transfer agent is chosen from the range of aliphatic thiols containing a linear or branched alkyl chain containing at least 6 carbon atoms, such as hexanethiol, dodecanethiol and terdodecanethiol. The preferred aliphatic thiols are dodecanethiol and terdodecanethiol.

The transfer agent may also be chosen from the range of fluorothiols which have a structure of the type $C_nF_{2n}$—$C_2H_4$—SH, n being between 4 and 10; the preferred fluorothiols are $C_6F_{13}(CH_2)_2$—SH and $C_8F_{17}(CH_2)_2$—SH.

The use of functional thiols also constitutes a suitable means for carrying out the telomerization reaction and contributing a reactive functional group such as a carboxylic acid functional group. The preferred functional thiol is thiogycolic acid.

The quantity of transfer agent to be employed is a function of the chain length that is desired for the oligomers. The number-average degree of polymerization aimed at in this type of application is, according to the process of the invention, between 5 and 10, which results in a percentage of thiol of between 5 and 25% by weight, preferably from 7 to 20% by weight.

The initiator is chosen from azo initiators such as 2,2'-azobisisobutyronitrile, 2,2'-azobis(2,4-dimethylvaleronitrile) or from peroxide initiators such as alkanoyl peroxides, peresters and hydroperoxides.

In general, the azo initiators such as 2,2'-azobisisobutyronitrile and 2,2'-azobis(2,4-dimethylvaleronitrile) are preferred, although the nature of the initiator is not the predominant parameter of the invention. The quantity of initiator to be employed is between 0.5 and 3 mol % relative to the sum of the number of moles of monomer and of transfer agent, preferably 0.5 to 1.5 mol %.

The solvent employed for the preparation of the telomers must be chemically inert towards the functional group of the reactive monomer. The boiling point of the solvent must obey a first constraint relating to the reaction temperature and must not be so high as to present problems when the polymer composition is being dried. The solvent must also have a transfer constant that is markedly lower than that of the thiol employed.

The preferred solvents are cyclic ethers such as THF, dioxane, preferably dioxane, aliphatic nitriles, preferably acetonitrile, aromatic compounds, preferably toluene or xylene. The preferred solvents are acetonitrile and toluene. The solvent concentration for the telomerization reaction is between 20 and 80%, preferably 30 to 70% by weight. The reaction temperature for initiation with 2,2'-azobisisobutyronitrile or 2,2'-azobis(2,4-dimethylvaleronitrile) is preferably between 60 and 80° C.

The reaction period is determined by a gas phase chromatography analysis. Thus, it has been shown that a period of 3 h 30 min at 75° C. is sufficient to exhaust the residual monomers.

Grafting of the reactive telomers

The telomer in solution in a solvent such as acetonitrile is employed without purification in the 2nd stage of grafting.

The monomer employed in this second stage is a function of the reactive monomer employed in the first stage. (Meth) acrylic acids are preferably employed when glycidyl methacrylate is the reactive monomer of the telomer. Glycidyl methacrylate is preferably employed when (meth)acrylic acid is the reactive monomer of the telomer. Cinnamic acid can also be employed advantageously for grafting an oligomer bearing epoxy functional groups, thus making it possible to obtain a composition that is crosslinkable under far UV.

The monomers are employed in a grafting monomer/reactive monomer molecular ratio of between 0.5 and 2.0 and preferably 0.9 to 1.1.

The esterification reaction of the epoxide functional groups is performed in the presence of a catalyst. This catalyst is chosen from tertiary amines such as triethylamine, dimethyllaurylamine, quaternary ammoniums and, in general, Brönsted acids such as paratoluenesulphonic acid or methanesulphonic acid. An organometallic chromium compound: chromium diisopropylsalicylate (CrDIPS) described in Br. Polym. J., 1971, Vol. 3, for activating the reaction between a carboxylic acid functional group and an epoxy functional group, constitutes the preferred catalyst for this reaction. The quantity of CrDIPS employed for catalysing the reaction is between 0.1 and 10 mol % relative to the number of epoxy or acid functional groups of the telomer and, preferably, between 1 and 8 mol %.

In the process according to the invention the monomer or telomer may be added or the reverse procedure may be carried out. It is preferable, however, to add the monomer or the telomer bearing the epoxy functional groups to the telomer or monomer bearing the carboxylic acid functional groups.

The solvent for the grafting reaction is preferably acetonitrile, but cyclic ethers or toluene may also be employed without this being highly detrimental to the reactivity of the system. The concentration is between 20 and 80% and preferably between 30 and 70%. To avoid any thermal polymerization during the grafting it is preferable to add a small quantity of a radical-inhibitor such as hydroquinone methyl ether (250–1000 ppm/grafting monomer) and to carry out gentle bubbling of air into the reaction mixture. The grafting reaction is carried out between 60 and 90° C. and preferably between 65 and 80° C. Monitoring of the reaction may be carried out by determining the residual acidic and epoxy functional groups.

The duration of the grafting reaction is between 10 and 24 hours, depending on the monitoring of the acidic and epoxy functional groups.

Curing of the unsaturated polyacrylic compositions

In the process according to the invention the grafted oligomer freed from the synthesis solvent is diluted with a mono- or polyfunctional reactive diluent. Among the monofunctional reactive diluents there may be mentioned isobornyl acrylate, morpholineacrylamide and nonylphenol acrylate. Among the polyfunctional diluents there may be mentioned trimethylolpropane triacrylate, trimethylolpropane trimethacrylate, tripropylene glycol diacrylate, butanediol diacrylate, hexanediol diacrylate, etc. The role of the reactive diluent is to lower the viscosity of the oligomer. The preferred diluents are polyfunctional diluents, because they make it possible to limit the necessary degree of grafting of the oligomer (in this case a proportion of the crosslinks is contributed by the diluent). However, the proportion of diluent must not be too high, in order not to decrease excessively the final proportion of fluorine in the composition. Thus, the weight quantity of the oligomer in the composition is between 90 and 50% and preferably between 80 and 60%; the weight quantity of the diluent is between 10 and 50% and preferably between 20 and 30%.

The curing of the polyacrylic resins produced may be obtained by adding an initiator which may be an azo initiator, or a peroxide optionally in combination with an activator of the tertiary aromatic amine type. The preferred initiation system consists of an organic peroxide, an aromatic amine and at least one accelerator.

The organic peroxide is chosen from cumene hydroperoxide, tert-butyl hydroperoxide, diisopropylbenzene hydroperoxide or from aliphatic or cycloaliphatic ketone peroxides, in particular methyl ethyl ketone peroxide, cyclohexanone peroxide, methyl isobutyl ketone peroxide or else from peresters, in particular t-butyl 2-ethylhexanoate peroxide. These peroxides are employed in a proportion of 0.2 to 2% by weight relative to the weight of the pure resin. The aromatic amines which are suitable for making use of the process are chosen from dimethyl-para-toluidine, dimethylaniline, diethylaniline and, more generally, from tertiary aromatic amines; the quantities used are between 0.1 and 2.0% by weight relative to the weight of the pure resin. The process is carried out by employing a catalyst system consisting of at least one accelerator chosen from cobalt octoate, cobalt naphthenate, cobalt ethylhexanoate or the product of the reaction of vanadium pentoxide with monobutyl phosphite or else from acetylacetone. When the accelerator is chosen from a cobalt salt, the quantity used according to the invention is between 100 and 1200 p.p.m., expressed as quantity of cobalt metal relative to the weight of the pure resin; when the accelerator is chosen from a vanadium salt, the quantity used is between 5 and 40 p.p.m., expressed as quantity of vanadium metal relative to the weight of the resin; finally, when the chosen accelerator is acetylacetone, the quantity employed is between 0.1 and 1%, expressed by weight relative to the weight of the pure resin.

The process is advantageously implemented by employing the catalyst systems used in combination in the following manner:

a liquid hydroperoxide with dimethyl-para-toluidine and the product of the reaction of vanadium pentoxide with monobutyl phosphite, a liquid hydroperoxide or a liquid ketone peroxide with dimethyl-para-toluidine and cobalt octoate, a liquid t-butyl 2-ethylhexanoate peroxide with dimethyl-para-toluidine and the pair of accelerators consisting of cobalt octoate and acetylacetone.

Curing of the polyacrylic compositions according to the invention can also be obtained by polymerization under UV radiation in the presence of one or more radical photoinitiators.

The photoinitiators employed for obtaining the photopolymerization are chosen from the range of benzoin ethers, acetophenone derivatives, acylphosphine oxides, diphenyl ketones and thioxanthone derivatives. The acetophenone derivatives are the preferred photoinitiators according to the invention; among these, 2,2'-ethoxyacetophenone and 1-hydroxycyclohexyl phenyl ketone give the best results.

The quantity of photoinitiator to be employed is between 1 and 10% by weight and preferably 2 and 8% of the photopolymerizable composition. The compositions are photopolymerized in conditions which are well known to a person skilled in the art, by passing through a UV tunnel.

Thermal or photochemical curing of the unsaturated polyacrylic compositions according to the invention makes it possible to obtain coatings exhibiting improved hydrophobic performance with a final mass composition of trifluoroethyl methacrylate of 15 to 80% by weight and preferably of 20 and 50% by weight.

The trifluoromethyl methacrylate concentration in the final composition constitutes the key point of the invention in order to obtain a coating exhibiting hydrophobic performance.

The following examples illustrate the invention.

EXAMPLE NO. 1

51.5 g of trifluoroethyl methacrylate (TRIFEMA), 32.3 g of glycidyl methacrylate (GLYMA), 16.2 g of dodecanethiol (DDM) and 100 g of acetonitrile are introduced into a 500-ml three-necked flask heated by an oil bath, supporting a vertical condenser and provided with stirring with a bar magnet and a nitrogen delivery.

The reactor is degassed by a flow of nitrogen and then its content is taken to about 75°–76° C. by heating the oil bath to 80° C. When the target temperature is reached, 0.9 mol % of 2,2'-azobisisobutyronitrile (AIBN), relative to the combined monomers+thiol, is introduced.

The temperature and the stirring are maintained for 3 h 30 min, the time needed to use up the residual monomers and the thiol. The content of the reactor is then cooled to ambient temperature and discharged.

After removal of the acetonitrile at reduced pressure a viscous oligomer is obtained, exhibiting an epoxide value (EV) of 2.22 mol/kg against a theoretical EV of 2.27 mol/kg, a number-average molecular mass ($M_n$) of 1340 and a cumulative number-average degree of polymerization ($\overline{DP}_{ncum}$) of 7.7.

The EV is the number of moles of epoxide groups per kg of dry sample. It is determined by the R. Jay's method, which consists in dissolving the sample to be determined in chloroform and titrating it with a standardized solution of perchloric acid in acetic acid in the presence of an excess of quaternary bromide. The end-point indicator is Crystal Violet.

EXAMPLES 2 TO 9

The procedure of Example 1 is repeated in Examples 2 to 9. These new tests differ from each other in the starting molar, and therefore mass, composition; the other parameters are kept constant.

The description of these tests and the results obtained are reported in Table No. 1.

TABLE NO. 1

TRIFEMA-BUA-GLYMA-DDM telomers

| Example | TRIFEMA g | GLYMA g | BUA g | DDM g | EV mole/kg | $\bar{M}_n$ osmomatry | $\overline{DP}_{ncum}$ |
|---|---|---|---|---|---|---|---|
| 2 | 54.1 | 9.0 | 28.6 | 8.2 | 0.60 | 1950 | 15.8 |
| 3 | 48.9 | 5.5 | 35.0 | 10.6 | 0.34 | 2740 | 12.1 |
| 4 | 48.4 | 5.8 | 34.8 | 11.0 | 0.40 | 2740 | 14.8 |
| 5 | 48.5 | 5.7 | 35.0 | 10.9 | 0.39 | 2776 | 15.0 |
| 6 | 48.5 | 5.7 | 34.9 | 10.9 | 0.40 | 2759 | 14.8 |
| 7 | 48.5 | 5.7 | 34.9 | 10.9 | 0.42 | 2750 | 14.9 |
| 8 | 48.1 | 9.1 | 26.1 | 16.7 | 0.60 | 2300 | 9.0 |
| 9 | 49.8 | 15.4 | 24.8 | 10.0 | 1.10 | 1950 | 12.8 | acetonitrile 100 g

AIBN 0.9 mol %/monomers+thiol

The calculation of $\overline{DP}_{ncum}$ is described in Eur. Polym. J., Vol. 27, No. 2, pages 159 to 163, 1981 (B. Boutevin, J. P. Parisi, P. Vaneeckoutte).

$$\frac{1}{DP_{ncum}} = \sum_{j=0}^{j=k-1} \frac{1}{(DP_{ni})_j} \text{ with } \frac{1}{DP_{ni}} = C_T \frac{[T]}{[M]}$$

[T] being the concentration of telogen, [M] that of monomer and $C_T$ the transfer constant of the monomer.

EXAMPLE NO. 10

The procedure of Example 1 is repeated with the following mass composition: 43.7 g of trifluoroethyl methacrylate, 21.9 g of glycidyl methacrylate, 22.3 g of 2-ethylhexyl acrylate and 12 g of dodecyl mercaptan. After evaporation of the acetonitrile a viscous and transparent oligomer is obtained which has an epoxy value of 1.4 mol/kg, an $\bar{M}_n$ of 1500 and a $\overline{DP}_{n\,cum}$ of 9.2.

EXAMPLE NO. 11

The procedure of Example 1 is repeated with the following mass composition: 42.1 g of trifluoroethyl methacrylate, 5 g of glycidyl methacrylate, 30.2 g of butyl acrylate and 22.7 g of perfluorooctylethylenethiol. After evaporation of the acetonitrile a viscous and transparent oligomer is obtained exhibiting the following characteristics:

EV=0.36 mol/kg $\overline{DP}_{n\,cum}$=14.8

Tg: 11° C.

EXAMPLE NO. 12

The procedure of Example 1 is repeated with the following mass composition: 44.2 g of trifluoroethyl methacrylate, 5.2 g of glycidyl methacrylate, 31.7 g of butyl acrylate and 18.8 g of perfluorohexylethylenethiol.

After evaporation of the acetonitrile a viscous and transparent oligomer is obtained exhibiting the following characteristics:

EV: 0.37 mol/kg $\overline{DP}_{n\,cum}$=14.8

Tg=11° C.

EXAMPLE NO. 13

The procedure of Example 1 is repeated with the following mass composition: 49.8 g of methyl methacrylate, 15.4 g of GLYMA, 24.8 g of BUA and 10 g of dodecyl mercaptan.

After evaporation of the acetonitrile a viscous oligomer is obtained exhibiting the following characteristics:

EV: 1.1 mol/kg $\bar{M}_n$: 2100

$\overline{DP}_{n\,cum}$: 13.0

EXAMPLE NO. 14

55.2 g of trifluoroethyl methacrylate, 8 g of acrylic acid, 30.6 g of butyl acrylate, 6.1 g of thioglycolic acid and 100 g of acetonitrile are introduced into a 500-ml three-necked flask heated by an oil bath, supporting a vertical condenser and provided with stirring by a bar magnet and a nitrogen delivery.

The reactor is degassed by a flow of nitrogen and then its content is heated to 80° C. When the target temperature has been reached, 0.9 mol % of 2,2'-azobisisobutyronitrile, relative to the combined monomers+thiol, is introduced.

The temperature and the stirring are maintained for 4 h. The content of the reactor is then cooled to ambient temperature and discharged.

After removal of the acetonitrile at reduced pressure a viscous and transparent oligomer is obtained exhibiting the following characteristics:

Acid value: 1.91 mol/kg

Tg: 22.3° C. (measured by calorimetry as described in the third edition of the Polymer Handbook).

EXAMPLE NO. 15

75 g of acetonitrile, 2.5 g of acrylic acid (acid/epoxy molar ratio=1.71), 0.7 g of CrDIPS (CrDIPS/epoxy molar ratio 7.8%) and 500 ppm of EMHQ relative to the acrylic acid are introduced into a 250-ml three-necked flask heated by an oil bath, supporting a vertical condenser and quipped with a dropping funnel, stirring by a bar magnet and with a dip pipe enabling dry air to be bubbled in. (EMHQ= hydroquinone methyl ether)

The content of the reactor is taken to 70° C. and a mixture of 25 g of acetonitrile and of 48 g of oligomer originating from Example No. 7, containing 1.16 mol of epoxy/mol is introduced over 1 hour while a very gentle bubbling of dry air is maintained.

The conversions of acrylic acid and of the epoxy functional groups are followed by determining the acidity and the epoxides. The reaction is stopped when the concentrations of acid and epoxy functional groups no longer change (13 hours).

The content of the reactor is then cooled to ambient temperature and then discharged, and after removal of the acetonitrile a viscous oligomer is obtained exhibiting the following characteristics:

final epoxy value=0.042 mol/kg, corresponding to a degree of conversion of the epoxy functional groups of 90%, final acid value=0.32 mol/kg, corresponding to a degree of conversion of the acrylic acid of 56%.

EXAMPLES NO. 16 TO 24

The procedure of Example 15 is reproduced, the nature of the catalyst and the catalyst/epoxy molar ratio being modified.

Acetonitrile: 100 g
Oligomer: 48 g

In Table 2 $NEt_3$ means triethylamine and AA means acrylic acid.

In this case a reaction time of 8 hours is obtained and, after evaporation of the dioxane, a viscous oligomer exhibiting the following characteristics:

final acid value: 0.26 mol/kg, corresponding to a degree of grafting of 87%, final epoxy value: 0.10 mol/kg, corresponding to a glycidyl methacrylate conversion of 94%.

EXAMPLE NO. 27

Photopolymerization of the various grafted telomers

The curing of the telomers is performed in the following manner: spreading, at ambient temperature, of the photopo-

TABLE NO. 2

| Example | Oligomer | Acrylic acid g | Acid/ epoxy | Catalyst | Cat./ epoxy % | Reaction time | Final EV mol/kg | Epoxy conv. % | Final AV mol/kg | AA conv. % |
|---|---|---|---|---|---|---|---|---|---|---|
| 16 | 1 | 8.8 | 1.12 | $NEt_3$ | 7.8 | 20h20 | 0.415 | 65 | 0.98 | 67.9 |
| 17 | 4 | 2.4 | 1.71 | CrDIPS | 7.8 | 24h | 0.05 | 87.2 | 0.31 | 54.7 |
| 18 | 6 | 2.3 | 1.66 | $NEt_3$ | 7.8 | 20h | 0.21 | 47.5 | 0.44 | 33.7 |
| 19 | 8 | 2.3 | 1.11 | $NEt_3$ | 7.8 | 24h | 0.44 | 31.7 | 0.39 | 41.4 |
| 20 | 9 | 4.2 | 1.11 | CrDIPS | 4.5 | 16h30 | 0.10 | 90.8 | 0 | 100 |
| 21 | 10 | 5.4 | 1.11 | CrDIPS | 4.5 | 14h20 | 0.15 | 92.0 | 0 | 100 |
| 22 | 11 | 1.5 | 1.2 | CrDIPS | 7.8 | 13h | 0.09 | 75.0 | 0 | 100 |
| 23 | 12 | 1.5 | 1.2 | CrDIPS | 7.8 | 24h | 0.06 | 85 | 0 | 100 |
| 24 | 13 | 4.6 | 1.2 | CrDIPS | 4.5 | 20h | 0.088 | 92 | 0.07 | 95 |

EXAMPLE NO. 25

The procedure of Example 15 is reproduced, employing the following composition: 75 g of acetonitrile, 50 g of oligomer originating from Example No. 14 and containing 1.91 moles of carboxylic acid/kg and 0.63 g of CrDIPS (CrDIPS/acid molar ratio:1.5%).

The content of the reactor is taken to 70° C. and a solution of 14.9 g of glycidyl methacrylate over-stabilized with 500 ppm of EMHQ in 25 g of acetonitrile is introduced over ½ hour, while a very gentle air bubbling is maintained. The reaction is stopped when the concentrations of acid and epoxy functional groups no longer change (24 hours).

The content of the reactor is then cooled to ambient temperature and then discharged. After removal of the acetonitrile a transparent viscous oligomer is obtained exhibiting the following characteristics.

acid value: 0.35 mol/kg corresponding to a degree of grafting of 82%.

epoxy value: 0.16 mol/kg, corresponding to a conversion of 90%.

EXAMPLE NO. 26

The procedure of Example 25 is reproduced, with the exception that the acetonitrile solvent for the reaction is replaced with dioxane and that the temperature is raised from 70° to 90° C.

lymerizable and photocrosslinkable composition containing the grafted oligomer, a polyfunctional reactive solvent and a photoinitiator on an aluminium or iron plate (degreased with trichloroethylene beforehand), by means of a 30-mm threaded rod. The covered plates are subsequently irradiated under the UV tunnel at a speed of 0.8 cm/s. After irradiation the plates are dried in an oven at 80° C.

To characterize the hydrophobic properties of the films, the coated plates are conditioned for 2 days at 21° C. under 50% humidity and then a measurement of the angle of contact with doubly distilled water is performed.

To characterize the solvent resistance of the coatings, the film is subjected to forward-and-back movements with a cotton saturated with methyl ethyl ketone until it is abraded.

The various compositions produced and the performances obtained using the coatings are listed together in Table No. 3.

This table shows a clear improvement in the hydrophobic performance of the coatings when the composition is produced from a grafted telomer containing trifluoroethyl methacrylate, compared with the reactive diluents alone and in the case where trifluoroethyl methacrylate is replaced with methyl methacrylate.

TABLE NO. 3

| | | | | Curing under radiation | | | | |
|---|---|---|---|---|---|---|---|---|
| Test | Grafted telomer | Talomer % | Reactive diluent | Diluent % | Photoinitiator (2) % | TRIFEMA (1) % | Contact angle * | MEK resistance |
| 28 | — | 0 | TMPTA | 100 | Irgacure 184 4% | 0 | 60 ± 2 | >200 |
| 29 | 15 | 80 | TMPTA | 20 | Irgacure 184 4% | 35.4 | 94, 7 ± 2.7 | 15 |

TABLE NO. 3-continued

<table>
<tr><th colspan="8">Curing under radiation</th></tr>
<tr><th>Test</th><th>Grafted telomer</th><th>Talomer %</th><th>Reactive diluent</th><th>Diluent %</th><th>Photoinitiator (2) %</th><th>TRIFEMA (1) %</th><th>Contact angle *</th><th>MEK resistance</th></tr>
<tr><td>30</td><td>18</td><td>80</td><td>TMPTA</td><td>20</td><td>Irgacure 184 4%</td><td>25.6</td><td>99</td><td>3</td></tr>
<tr><td>31</td><td>18</td><td>70</td><td>TMPTA</td><td>30</td><td>Irgacure 184 4%</td><td>31.2</td><td>95</td><td>40</td></tr>
<tr><td>32</td><td>16</td><td>80</td><td>TMPTA</td><td>20</td><td>Irgacure 184 4%</td><td>33.5</td><td>79 ± 1.5</td><td>>200</td></tr>
<tr><td>33</td><td>15</td><td>70</td><td>TPGDA</td><td>30</td><td>Irgacure 184 4%</td><td>31.0</td><td>100 ± 2.3</td><td>4</td></tr>
<tr><td>34</td><td>16</td><td>50</td><td>TPGDA</td><td>50</td><td>Irgacure 184 4%</td><td>20.9</td><td>88 ± 1.5</td><td>100</td></tr>
<tr><td>35</td><td>15</td><td>70</td><td>HDDA</td><td>30</td><td>Irgacure 184 4%</td><td>31.0</td><td>100</td><td>5</td></tr>
<tr><td>36</td><td>—</td><td>0</td><td>HDDA</td><td>100</td><td>Irgacure 184 4%</td><td>0</td><td>48 ± 1</td><td>>200</td></tr>
<tr><td>37</td><td>24</td><td>80</td><td>TMPTA</td><td>20</td><td>Irgacure 184 4%</td><td>0</td><td>72 ± 2</td><td>20</td></tr>
<tr><td>38</td><td>20</td><td>70</td><td>TPGDA</td><td>30</td><td>Irgacure 184 4%</td><td>30.8</td><td>84</td><td>10</td></tr>
<tr><td>39</td><td>22</td><td>70</td><td>TMPTA</td><td>30</td><td>Irgacure 184 4%</td><td>27.5</td><td>106 ± 2</td><td>25</td></tr>
<tr><td>40</td><td>25</td><td>70</td><td>TMPTA</td><td>30</td><td>Irgacure 184 4%</td><td>28.6</td><td>95 ± 1.6</td><td>>200</td></tr>
</table>

MEK is methyl ethyl ketone
Irgacure 184 is 1-hydroxycyclohexyl phenyl ketone
TMPTA is trimethylolpropane triacrylate
TPGDA is tripropylene glycol diacrylate.
(1) Overall % TRIFEMA taking into account the addition of the grafting monomer, of the reactive diluent and of the photoinitiator.
(2) % Photoinitiaor/(telomer + reactive diluent).

The angles of contact are measured with the aid of a goniometer, with doubly distilled water, at a temperature of 21° C. on plates which have been treated and conditioned for 2 days in a room at 50% humidity. This latter precaution allows the possible polar groups in the film to be oriented towards the surface. This provides conditions which are suitable for measuring the angles of contact.

The angle of contact measured with water allows the polar component of the surface tension of the coating to be determined. The higher angle of contact, the more hydrophobic is the coating.

The resistance of MEK consists in measuring the number of forward-and-back movements performed while passing a paper soaked in MEK over the film until the latter is damaged.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing examples, all temperatures are set forth uncorrected in degrees Celsius and unless otherwise indicated, all parts and percentages are by weight.

The entire disclosure of all applications, patents and publications, cited above and below, and of corresponding French application 94/14367, are hereby incorporated by reference.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

We claim:

1. A thermally or photochemically curable fluorinated resin composition, comprising:
   (A) from 50 to 90 parts by weight of a grafted reactive telomer obtained by telomerization of:
      (a) 15 to 80% by weight of trifluoroethyl methacrylate;
      (b) 5 to 40% by weight of at least one reactive monomer from the group consisting of:
         (b1) acrylic acid, methacrylic acid;
         (b2) epoxidized (meth)acrylic monomers, hydroxylated (meth)acrylic monomers, acryloyl chloride, methacryloyl chloride, and (meth) acryloyloxyalkyl isocyanates;
      (c) 0 to 60% by weight of at least one (meth)acrylic monomer devoid of any reactive functional group other than a double bond; and
      (d) 5 to 25% by weight of at least one thiol selected from the group consisting of aliphatic thiols having a linear or branched alkyl chain having at least 6 carbon atoms, fluorinated thiols having a perfluoroalkylalkylene chain, and thioglycolic acid;
   said telomerization being followed by a grafting reaction with the provisos that:
      (i) when said at least one monomer (b1) is employed to produce said reactive telomer, the reactive telomer is grafted by 1–25% by weight of said at least one monomer (b2);
      (ii) when said at least one monomer (b2) is employed to produce said reactive monomer, the reactive monomer is grafted by 1–25% by weight of said at least one monomer (b1), or when (b2) is an epoxidized (meth)acrylic monomer, the telomer is optionally grafted by cinnamic acid; and (B) from 50 to 10 parts by weight of at least one monofunctional or polyfunctional reactive diluent.

2. The composition according to claim 1, wherein said monomer (b2) comprises glycidyl methacrylate.

3. The composition according to claim 1, wherein said monomer (b2) comprises a hydroxyethyl, hydroxypropyl or hydroxybutyl (meth)acrylate.

4. The composition according to claim 1, wherein said monomer (b2) comprises methacryloyloxyethyl isocyanate.

5. The composition according to claim 1, wherein said monomer (c) comprises an alkyl (meth)acrylate.

6. The composition according to claim 5, wherein the alkyl (meth)acrylate (c) is selected from the group consisting of butyl methacrylate, butyl acrylate, ethyl acrylate, methyl acrylate, 2-ethylhexyl acrylate, nonyl acrylate and octyl acrylate.

7. The composition according to claim 1, wherein the thiol (d) comprises a thiol of the formula R—SH, R representing a linear alkyl group having 8 to 20 carbon atoms, or a $C_4$–$C_{10}$-perfluoroalkyl-alkylenethiol.

8. The composition according to claim 1, wherein the reactive diluent is selected from the group consisting of isobornyl acrylate, morpholine acrylamide and nonylphenol acrylate.

9. The composition according to claim 1, wherein the reactive diluent is selected from the group consisting of trimethylolpropane triacrylate, trimethylolpropane trimethacrylate, tripropyleneglycol diacrylate, butanediol diacrylate and hexanediol diacrylate.

10. The composition according to claim 1, wherein the reactive telomer has a number-average molecular mass of between 600 and 5000.

11. The composition according to claim 1, wherein the degree of polymerization of the reactive telomer is between 5 and 16.

12. The composition according to claim 1, wherein the grafting monomer/reactive monomer molecular ratio for the grafting of the reactive telomer is between 0.5 and 2.0.

13. The composition according to claim 1, being photopolymerizable or photocrosslinkable, and containing 1 to 10% by weight of a photoinitiator with respect to (A)+(B).

14. A substrate coated with a composition as defined in claim 13, and photochemically cured.

15. The composition according to claim 1, being thermocrosslinkable, and containing an azo initiator or a peroxide or hydroperoxide optionally in combination with a tertiary aromatic amine activator and with an accelerator.

16. A substrate coated with a composition as defined in claim 15, and thermally cured.

17. A substrate coated with a composition as defined in claim 1, and thermally or photochemically cured.

18. The composition according to claim 1, wherein the telomer consists essentially of (a), (b), (c), and (d).

19. A substrate coated with a composition as defined in claim 18, and thermally or photochemically cured.

* * * * *